No. 12,222. REISSUED MAY 24, 1904.
G. F. READ.
DELIVERY MECHANISM FOR PRINTING PRESSES.
APPLICATION FILED DEC. 24, 1901.
3 SHEETS—SHEET 1.
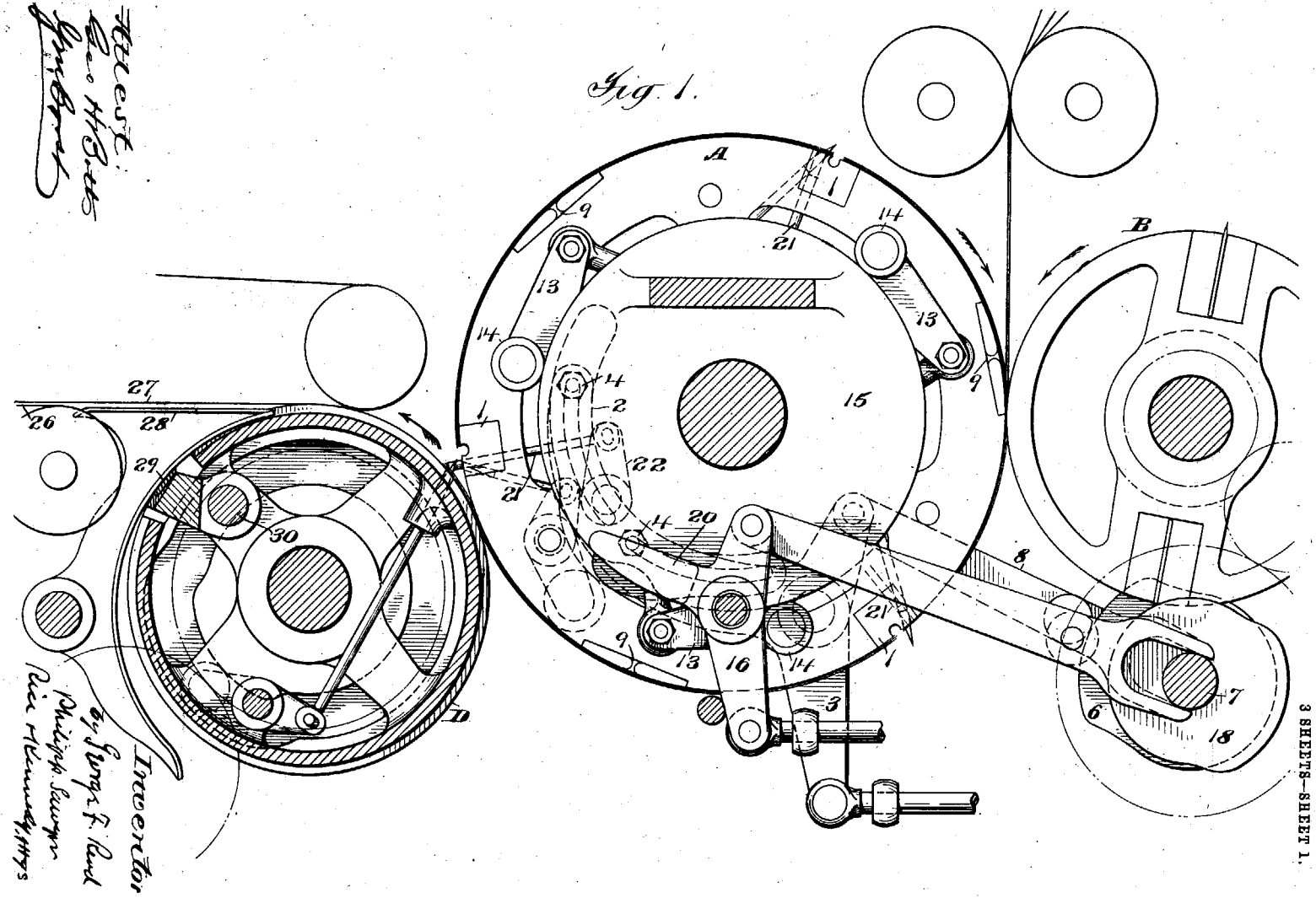
THE NORRIS PETERS CO., PHOTO-LITHO., WASHINGTON, D. C.

No. 12,222. REISSUED MAY 24, 1904.
G. F. READ.
DELIVERY MECHANISM FOR PRINTING PRESSES.
APPLICATION FILED DEC. 24, 1901.
3 SHEETS—SHEET 2.
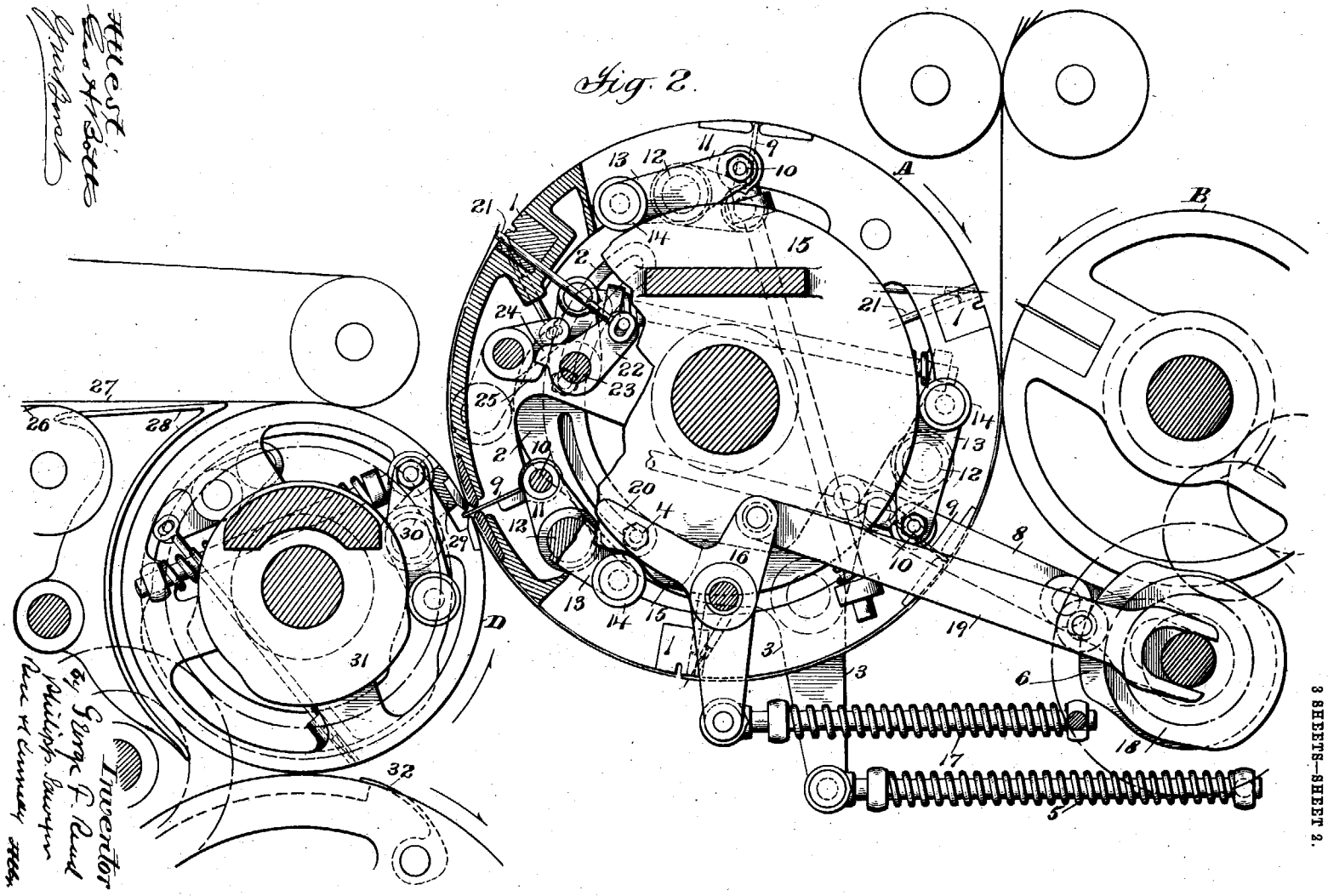
THE NORRIS PETERS CO., PHOTO-LITHO., WASHINGTON, D. C.

No. 12,222. REISSUED MAY 24, 1904.
G. F. READ.
DELIVERY MECHANISM FOR PRINTING PRESSES.
APPLICATION FILED DEC. 24, 1901.
3 SHEETS—SHEET 3.
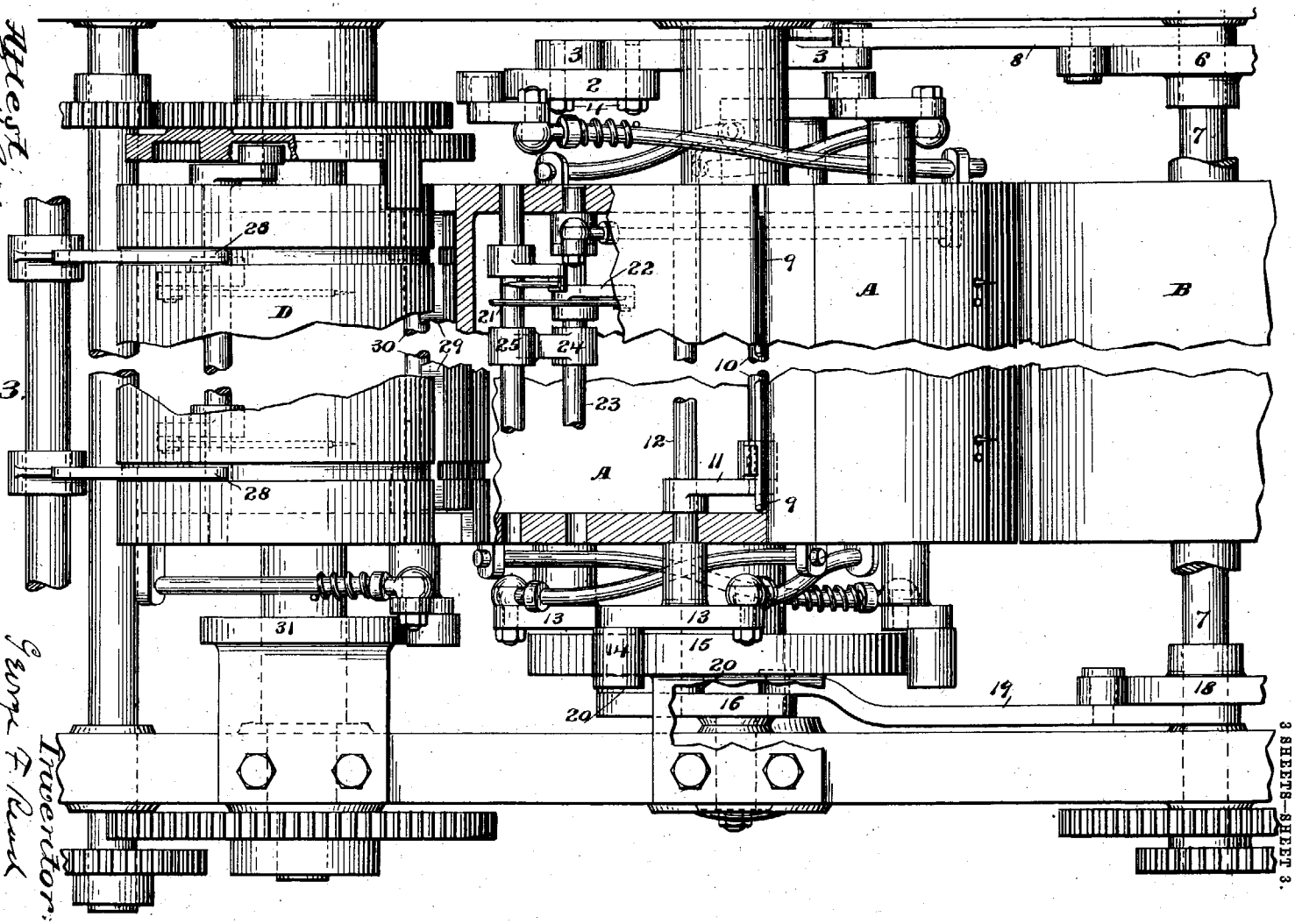
THE NORRIS PETERS CO., PHOTO-LITHO., WASHINGTON, D. C.

No. 12,222. Reissued May 24, 1904.

UNITED STATES PATENT OFFICE.

GEORGE F. READ, OF NEW YORK, N. Y., ASSIGNOR, BY DIRECT AND MESNE ASSIGNMENTS, TO ROBERT HOE AND CHARLES W. CARPENTER, OF NEW YORK, N. Y.

DELIVERY MECHANISM FOR PRINTING-PRESSES.

SPECIFICATION forming part of Reissued Letters Patent No. 12,222, dated May 24, 1904.

Original No. 639,770, dated December 26, 1899. Application for reissue filed December 24, 1901. Serial No. 87,137.

*To all whom it may concern:*

Be it known that I, GEORGE F. READ, a citizen of the United States, residing at New York, county of Kings, and State of New York, have invented certain new and useful Improvements in Delivery Mechanism for Printing-Presses, fully described and represented in the following specification and the accompanying drawings, forming a part of the same.

My present invention has for its object to provide a convenient means for cutting sheets from a web and collecting the same capable particularly of application to delivering products having small-sized sheets; and it consists in certain constructions and certain parts, improvements, and combinations, which will be hereinafter described, and fully pointed out in the claims hereunto appended.

My invention further includes certain details of construction hereinafter fully described, and pointed out in the claims.

In the drawings annexed, Figures 1 and 2 are sectional elevations showing different positions of the parts, and Fig. 3 is a plan view of a delivery embodying my invention.

The web passes from any suitable printing mechanism between the two carriers A and B. The carrier A is provided with a plurality of segmental surfaces, each corresponding in length to the sheets to be received upon it. In the drawings three segments are shown. The number, however, may be varied as desired. The carrier is preferably provided with a number of cutting-blocks 1, corresponding to the number of segmental surfaces above mentioned, with which cutting-blocks coöperate knives carried by the carrier B. The carrier A is also preferably provided with a set of pins for each of the segmental surfaces. These pins may be mounted upon the usual spring-actuated shafts and are preferably provided with levers and bowls which may be operated to withdraw the pins by the cam 2, attached to the pivoted three-armed lever 3 by bolts 4 passing through slots in the cam, as shown in Figs. 1 and 2. The lever 3 is pivoted and is pushed in one direction by the spring 5 and is moved in the other direction by the cam 6 on shaft 7 through cam-link 8. The cam 2 is placed in the position shown in Fig. 2 when the collected sheets on the carrier A are to be folded off from the said carrier and when, therefore, the pins are withdrawn from the ends of the sheets at the position of withdrawal shown in Fig. 2. The cam 2 is placed with the bolts 4 at the other end of the slots therein, as shown in Fig. 1, when the sheets are to be delivered from the collecting-carrier without folding, as illustrated in Fig. 1. The carrier A may, however, be used for collecting sheets. In such cases, therefore, it is necessary to provide means for causing the withdrawal of the pins to be intermitted while the given number of sheets is being accumulated, and to this end the cam 2 is mounted on the lever 3, as above described. The shaft 7 is rotated from the cylinder B by gearing at such a relative speed that the cam 6 will operate the lever 3 once in as many revolutions or parts of revolutions of the carrier A as the latter is designed to make between successive deliveries. When the cam 6 is not operative upon the lever 3, that lever will, by the pressure of spring 5, be in the position in which it is withdrawn, so as to be out of the path of the bowls controlling the pins, and therefore the pins as they pass the cam 2 will not be withdrawn. When, however, the cam 6 is operative, it throws the cam 2 into operative position, such that as the pins pass it they will be withdrawn, as shown in Figs. 1 and 2. Thus if two sheets are to be collected upon each of the segments on the carrier A shaft 7 will be so geared as to rotate once during each two-thirds revolution of the carrier A. If four sheets are to be collected upon carrier A, the shaft will be geared to rotate once for each one and one-third revolution of the carrier A, and so on.

The mechanism for folding the collected sheets off from the carrier preferably consists of reciprocating folding or tucking blades 9, rigidly mounted upon the shafts 10, carried by arms 11, mounted upon shafts 12, provided with levers 13 and bowls 14, which ride upon a cam 15. While the parts are in the position shown in Fig. 2 the tucking-blades 9 will be protruded each time the bowls 14 drop into the depression of the cam 15, as shown in Fig. 2—that is, once for each one-third revolution of the carrier A. The carrier A may, however, be used to collect sheets. In such cases, therefore, it is necessary to provide means for causing the tucking-blades 9 to intermit their operation while the given number of sheets is being accumulated, and for that purpose the pivoted triangular lever 16 is preferably provided, pressed in one direction by spring 17 and operated in the other direction by cam 18 on shaft 7 through cam-link 19. This lever is pushed forward while the sheets are being collected by the cam 18, so as to force its end 20 forward into position, such as to bridge the depression in the cam 15 and prevent the tucking-blade from being protruded; but when the collection on any segment is completed the lever 18 is moved inward, uncovering the depression in cam 15, which allows the bowl 14 to drop therein and the tucking-blade to operate. The operation of these parts is substantially the same as that of the corresponding devices connected with the pins, and the cam 18 is mounted upon the same shaft as the cam which governs the pins. Thus the tucking-blade will be brought into operation at the same moment at which the pins are withdrawn.

Plungers 21 may be provided for pushing out the ends of the sheets when the pins are withdrawn in order to facilitate and make certain the transfer of the sheets from the carrier-cylinder to the delivery-cylinder D. These pins are preferably carried by arms 22 on spring-shafts 23, provided with lugs 24, which engage with lugs 25 on the pin-shafts. The arrangement of the parts is such that normally the shaft 23 is held by its spring with its lug 24 in contact with the lug 25, and the plungers 22 are then in their withdrawn position. When the pins are withdrawn, the swinging of the lugs 25 permits the shafts 23 to swing, thus causing the plungers 22 to move outward and push the ends of the sheets from the carrier A, as shown in Fig. 1, onto the carrier D and causing them at the same time to be impaled by the pins of the carrier D. This action also takes place when the sheets are folded, as shown in Fig. 2, but is of no special importance in this instance.

When the sheets are delivered from the carrier A unfolded, they are caught by the pins on the carrier D and delivered to tapes 26 27, being stripped from the cylinder by stripper 28. When the sheets are delivered folded from the carrier A, the tucking-blades 9 are brought into service, and with them coöperate pivoted jaws 29, mounted upon spring-pressed shaft 30, whose bowl is controlled by a cam 31. The cam 31 is so shaped as to cause the jaw 29 to close on the fold of the paper and carry it around the carrier D and deliver it to the grippers 32. In this use of the mechanism the switch 28 is thrown into the position shown in Fig. 2. When the sheets are delivered unfolded, the jaw 29 is locked out of operation in the usual manner. So, too, in such case the tucking-blades 9 of carrier A are also locked out of operation.

The advantages of the construction above described are based, among other things, upon the following considerations:

First. It is desirable to provide a carrier with a plurality of collecting-surfaces in such machines, for the reason that the sheets, especially in pamphlet and magazine work, are frequently so small that if the collecting-cylinder were adapted to receive but a single sheet it would be of an impracticably small diameter.

Second. My invention involves the advantage of enabling the cutting of the sheets to be performed while the sheets are resting upon the collecting-carrier. Thus a more perfect register of the sheets is secured than if they were cut loosely and brought after they were cut to the collecting-carrier, and, moreover, a smaller number of pins is required than would be the case were the sheets cut on a separate cylinder, as the carrier B.

It will be observed that any number of sheets desired may be superimposed upon each other upon the collecting-surfaces of carrier A, provided that such number be not the same as nor a multiple of the number of collecting-surfaces, in which case identical sheets would be superimposed.

What I claim is—

1. The combination with a rotating carrier provided with a plurality of sheet-receiving surfaces, of means for supplying sheets to the carrier so that successive sheets shall be laid upon successive surfaces, devices for folding off the sheets from the carrier, said devices being arranged to always operate at the same point in the revolution of the carrier, and means whereby said devices may be caused to operate during any revolution of the carrier, substantially as described.

2. The combination with a rotating carrier provided with a plurality of sheet-receiving surfaces, of means for supplying sheets to the carrier so that successive sheets shall be laid upon successive surfaces, a series of folding-off devices, one for each surface, operating to fold-off the sheets from the carrier, the folding-off devices being arranged to operate at the same point in the revolution of the carrier, and means whereby said devices may be caused to operate during any revolution of the carrier, substantially as described.

3. The combination with a rotating carrier provided with a plurality of sheet-receiving surfaces, of means for supplying sheets to the carrier so that successive sheets shall be laid upon successive surfaces, reciprocating folding-blades, one for each surface, mounted in the carrier, said folding-blades being arranged to operate at the same point in the revolution of the carrier, and means whereby said folding-blades may be caused to operate during any revolution of the carrier, substantially as described.

4. The combination with a rotating carrier provided with a plurality of receiving-surfaces, of means for feeding a web to said carrier and securing its leading end to the leading end of one of said surfaces, means for severing from the web a sheet corresponding in length to one of said surfaces while the web is resting upon the carrier, means for securing the new leading end of the web to the leading end of the next succeeding surface, devices for folding off the sheets from the carrier, and means whereby said devices may be caused to operate during any revolution of the carrier, substantially as described.

5. The combination with a rotating carrier provided with a plurality of receiving-surfaces, of means for feeding a web to said carrier and securing its leading end to the leading end of one of said surfaces, means for severing from the web a sheet corresponding in length to one of said surfaces while the web is resting upon the carrier, means for securing the new leading end of the web to the leading end of the next succeeding surface, a series of folding-off devices, one for each surface, operating to fold off the sheets from the carrier and arranged to operate at the same point in the revolution of the carrier, and means whereby said devices may be caused to operate during any revolution of the carrier, substantially as described.

6. The combination with a rotating carrier provided with a plurality of receiving-surfaces, of means for supplying sheets to the carrier, pins for securing the leading ends of the sheets to the leading ends of each of the surfaces, a series of folding-off devices, one for each surface, said devices being arranged to operate at the same point in the revolution of the carrier, and means whereby said devices may be caused to operate during any revolution of the carrier, substantially as described.

7. The combination with a rotating carrier provided with a plurality of sheet-receiving surfaces, of means for supplying sheets or cuts to the carrier so that successive sheets or cuts shall be laid upon successive surfaces, devices for folding off the sheets or cuts from the carrier, said devices being arranged to always operate at the same point in the revolution of the carrier, and means whereby said devices may be caused to operate to fold off two or four cuts, substantially as described.

8. The combination with a rotating carrier provided with a plurality of sheet-receiving surfaces, of means for supplying sheets or cuts to the carrier so that successive sheets or cuts shall be laid upon successive surfaces, a series of folding-off devices, one for each surface, operating to fold off the sheets or cuts from the carrier, the folding-off devices being arranged to operate at the same point in the revolution of the carrier, and means whereby said devices may be caused to operate to fold off two or four cuts, substantially as described.

9. The combination with a rotating carrier provided with a plurality of sheet-receiving surfaces, of means for supplying sheets or cuts to the carrier so that successive sheets or cuts shall be laid upon successive surfaces, reciprocating folding-blades, one for each surface, mounted in the carrier, said folding-blades being arranged to operate at the same point in the revolution of the carrier, and means whereby said folding-blades may be caused to operate to fold off two or four cuts, substantially as described.

10. The combination with a rotating carrier provided with a plurality of receiving-surfaces, of means for feeding a web to said carrier and securing its leading end to the leading end of one of said surfaces, means for severing from the web a sheet or cut corresponding in length to one of said surfaces while the web is resting upon the carrier, means for securing the new leading end of the web to the leading end of the next succeeding surface, devices for folding off the sheets from the carrier, and means whereby said devices may be caused to operate to fold off two or four sheets or cuts, substantially as described.

11. The combination with a plurality of receiving-surfaces, of means for feeding a web to said carrier and securing its leading end to the leading end of one of said surfaces, means for severing from the web a sheet or cut corresponding in length to one of said surfaces while the web is resting on the carrier, means for securing the new leading end of the web to the leading end of the next succeeding surface, a series of folding-off devices, one for each surface, operating to fold off the sheets from the carrier and arranged to operate at the same point in the revolution of the carrier, and means whereby said devices may be caused to operate to fold off two or four sheets or cuts, substantially as described.

12. The combination with a rotating carrier provided with a plurality of receiving-surfaces, of means for supplying sheets or cuts to the carrier, pins for securing the leading ends of the sheets or cuts to the leading ends of each of the surfaces, a series of folding-off devices, one for each surface, said devices being arranged to operate at the same point in the revolution of the carrier, and means whereby said devices may be caused to operate to fold off two or four sheets or cuts, substantially as described.

13. The combination of a carrier provided with a plurality of receiving-surfaces, means for feeding a web to said carrier, pins for securing the leading end of the web to the leading end of one of said surfaces, means for severing from the web a sheet corresponding in length to one of said surfaces while the paper is resting upon the carrier, pins for securing the new leading end of the web to the leading end of the next succeeding surface, and so on until the required number of sheets is collected on each surface, a series of folding-off devices, one for each surface, said folding-off devices being arranged to operate at the same point in the revolution of the carrier, and means whereby said devices may be caused to operate during any revolution of the carrier, substantially as described.

14. The combination of a carrier provided with a plurality of receiving-surfaces, means for feeding a web to said carrier and securing its leading end to the leading end of one of said surfaces, means for severing from the web a sheet corresponding in length to said surfaces while the paper is resting upon the carrier, means for securing the new leading end of the web to the leading end of the next succeeding surface, and so on until the required number of sheets is collected on each surface, means for folding each set of collected sheets, means for delivering the collected sheets unfolded from the carrier, and means for bringing either the folding mechanism or the delivering mechanism into operation, as desired, substantially as described.

15. The combination of a carrier provided with a plurality of receiving-surfaces, means for feeding a web to said carrier, pins for securing the leading end of the web to the leading end of one of said surfaces, means for severing from the web a sheet corresponding in length to one of said surfaces while the paper is resting upon the carrier, pins for securing the new leading end of the web to the leading end of the next succeeding surface, and so on until the required number of sheets is collected on each surface, means for folding each set of collected sheets, means for delivering the collected sheets unfolded from the carrier, and means for bringing either the folding mechanism or the delivering mechanism into operation, as desired, substantially as described.

16. The combination of a carrier provided with a plurality of receiving-surfaces, means for feeding a web to said carrier and securing its leading end to the leading end of one of said surfaces, means for severing from the web a sheet corresponding in length to said surfaces while the paper is resting upon the carrier, means for securing the new leading end of the web to the leading end of the next succeeding surface, and so on until the required number of sheets is collected on each surface, means for varying the number of sheets collected at will, and means for folding off the collected sheets from the carrier, said folding-off devices being arranged to operate at the same point in the revolution of the carrier, substantially as described.

17. The combination with a cylindrical carrier provided with a plurality of collecting-surfaces, of means for feeding a web to said carrier and securing its leading end to the leading end of one of said surfaces, means for securing from the web a sheet corresponding in length to said surfaces while the paper is resting upon the carrier, means for securing the new leading end of the web to the leading end of the next succeeding surfaces, and so on until the required number of sheets is collected on each surface, means for varying the number of sheets collected at will, means for folding each set of collected sheets, means for detaching the collected unfolded sheets from the carrier, and means for bringing either the folding or detaching mechanism into operation, as desired, substantially as described.

18. The combination with a rotating carrier, of a set of sheet-holding pins, folding-off devices, means whereby said devices may be rendered operative or inoperative, and means whereby the pins may be withdrawn from the sheet at two points in the revolution of the carrier, substantially as described.

19. The combination with a rotating carrier having a series of sheet-receiving surfaces, a series of sheet-holding pins, and a series of folding-off devices, of means whereby the folding-off devices may be rendered operative or inoperative, and means for withdrawing the pins at either of two points in the revolution of the carrier, substantially as described.

20. The combination with a rotating carrier provided with a series of sheet-receiving surfaces, a series of sheet-holding devices, and a series of folding-off devices, of means whereby the folding-off devices may be rendered operative or inoperative, and means whereby the holding devices may be caused to release the sheet at either of two points in the revolution of the carrier, substantially as described.

21. The combination with a rotating carrier having a series of sheet-receiving surfaces, a series of sheet-holding devices, a series of folding-off devices, and a series of sheet-lifting devices, of means whereby the folding-off devices may be rendered operative or inoperative, and means whereby the sheet-holding devices may be caused to release and the sheet-lifting devices caused to lift the sheet at two points in the revolution of the carrier, substantially as described.

22. The combination with a rotating carrier provided with a plurality of sheet-receiving surfaces, of means for supplying sheets to the carrier so that successive sheets may be laid upon successive surfaces, folding devices carried by the carrier for folding off the sheets therefrom, said devices being arranged to always operate at the same point in the revolution of the carrier, means including a rotating cam for operating said devices, said cam having a different axis of rotation from that of the carrier, and means for varying the relative speed of rotation between the cam and carrier whereby the cam is caused to operate part of the folding devices on one revolution of the carrier and a part of the folding devices on another revolution of the carrier, substantially as described.

23. The combination with a rotating carrier provided with a plurality of sheet-receiving surfaces, of means for supplying sheets to the carrier so that successive sheets may be laid upon successive surfaces, folding devices carried by the carrier for folding off the sheets therefrom, said devices being arranged to always operate at the same point in the revolution of the carrier, means for driving the carrier at a constant speed, means including a rotating cam for operating the folding devices, said cam having a different axis of rotation from that of the carrier, and means for varying the speed of rotation of the cam whereby the cam is caused to operate part of the folding devices on one revolution of the carrier and a part of the folding devices on another revolution of the carrier, substantially as described.

24. The combination with a rotating carrier provided with a plurality of sheet-receiving surfaces, of means for supplying sheets to the carrier so that successive sheets may be laid upon successive surfaces, folding-blades carried by the carrier for folding off the sheets therefrom, said blades being arranged to always operate at the same point in the revolution of the carrier, a cam for operating the blades, a rotating cam for controlling the operation of the first cam on the blades, and means for driving the rotating cam at different speeds, substantially as described.

25. The combination with a rotating carrier provided with a plurality of sheet-receiving surfaces, of means for supplying sheets to the carrier so that successive sheets may be laid upon successive surfaces, folding-blades carried by the carrier for folding off the sheets therefrom, said blades being arranged to always operate at the same point in the revolution of the carrier, a cam for operating the blades, a guard for preventing the operation of the cam, a rotating cam, and connections whereby the rotating cam controls the position of the guard, substantially as described.

26. The combination with a rotating carrier provided with a plurality of sheet-receiving surfaces, of means for supplying sheets to the carrier so that successive sheets may be laid upon successive surfaces, folding-blades carried by the carrier for folding off the sheets therefrom, said blades being arranged to always operate at the same point in the revolution of the carrier, a cam for operating the blades, a guard for preventing the operation of the cam, a rotating cam, connections whereby the rotating cam controls the position of the guard, and means for driving the rotating cam at different speeds, substantially as described.

27. The combination with a rotating carrier provided with a plurality of sheet-receiving surfaces, of means for supplying sheets to the carrier so that successive sheets may be laid upon successive surfaces, folding-blades carried by the carrier for folding off the sheets therefrom, said blades being arranged to always operate at the same point in the revolution of the carrier, means including a rotating cam for operating said blades, means for varying the relative speed of rotation between the cam and carrier, and a rotating mechanism to which the folding-blades deliver, substantially as described.

28. The combination with a rotating carrier provided with a plurality of sheet-receiving surfaces, of means for supplying sheets to the carrier so that successive sheets may be laid upon successive surfaces, folding-blades carried by the carrier for folding off the sheets therefrom, said blades being arranged to always operate at the same point in the revolution of the carrier, means including a rotating cam for operating said blades, means for driving the rotating cam at different speeds, and a rotating mechanism to which the folding-blades deliver.

In testimony whereof I have hereunto set my hand in the presence of two subscribing witnesses.

GEORGE F. READ.

Witnesses:
F. W. H. CRANE,
GEO. V. WILLIAMSON.